United States Patent [19]
Yamazaki et al.

[11] Patent Number: 4,703,239
[45] Date of Patent: Oct. 27, 1987

[54] ARBITRARY-DIRECTION TRACER CONTROL UNIT

[75] Inventors: Etsuo Yamazaki; Hitoshi Matsuura, both of Hachioji, Japan

[73] Assignee: Fanuc Ltd., Minamitsuru, Japan

[21] Appl. No.: 923,141

[22] PCT Filed: Feb. 12, 1986

[86] PCT No.: PCT/JP86/00061

§ 371 Date: Sep. 19, 1986

§ 102(e) Date: Sep. 19, 1986

[87] PCT Pub. No.: WO86/04852

PCT Pub. Date: Aug. 28, 1986

[30] Foreign Application Priority Data

Feb. 26, 1985 [JP] Japan .................. 60-37197

[51] Int. Cl.[4] ........................................ G05B 19/36
[52] U.S. Cl. .................... 318/578; 364/474; 318/571
[58] Field of Search ............ 318/578, 571, 579, 39; 364/474, 161–171

[56] References Cited

U.S. PATENT DOCUMENTS

| | | | |
|---|---|---|---|
| 4,224,670 | 9/1980 | Yamazaki | 318/578 X |
| 4,357,664 | 11/1982 | Imazeki et al. | 364/474 |
| 4,456,962 | 6/1984 | Imazeki et al. | 364/474 X |
| 4,534,685 | 8/1985 | Komiya et al. | 318/578 X |

*Primary Examiner*—Benjamin Dobeck
*Attorney, Agent, or Firm*—Staas & Halsey

[57] ABSTRACT

The present invention is intended to improve the machining accuracy of tracer control which moves a tracer head and a model relative to each other along a path specified by numerical information.

Profile arithmetic means (4, 5, 30 to 33) creates a velocity signal ($V_a$) in a tracing feed direction and a velocity signal ($V_z$) in the Z direction on the basis of displacement signals ($\epsilon_x$, $\epsilon_y$, $\epsilon_z$) from the tracer head (1) and direction signals (sin $\alpha$, cos $\alpha$) indicating the tracing feed direction, which are supplied from direction signal generating means (36). Velocity signal generating means (18, 19) derives command pulse signals in the X and Y directions from numerical information indicating the path of travel of the tracer head (1) and the velocity signal ($V_a$) in the tracing feed direction produced by the profile arithmetic means (4, 5, 30 to 33). X- and Y-direction drive means (10X, 10Y) drive the tracer head (1) and the model (3) relative to each other in the X and Y directions in accordance with the output signals of the command pulse signal generating means (18, 19), and Z-direction drive means (10Z) drives the tracer head (1) and the model (3) relative to each other in the Z direction in accordance with the output signal ($V_z$) of the profile arithmetic means (4, 5, 30 to 33). The direction signal generating means (36) derives from the output signal of the command pulse signal generating means direction signals (sin $\alpha$, cos $\alpha$) indicating the tracing feed direction, and provides them to the profile arithmetic means (4, 5, 30 to 33).

1 Claim, 3 Drawing Figures

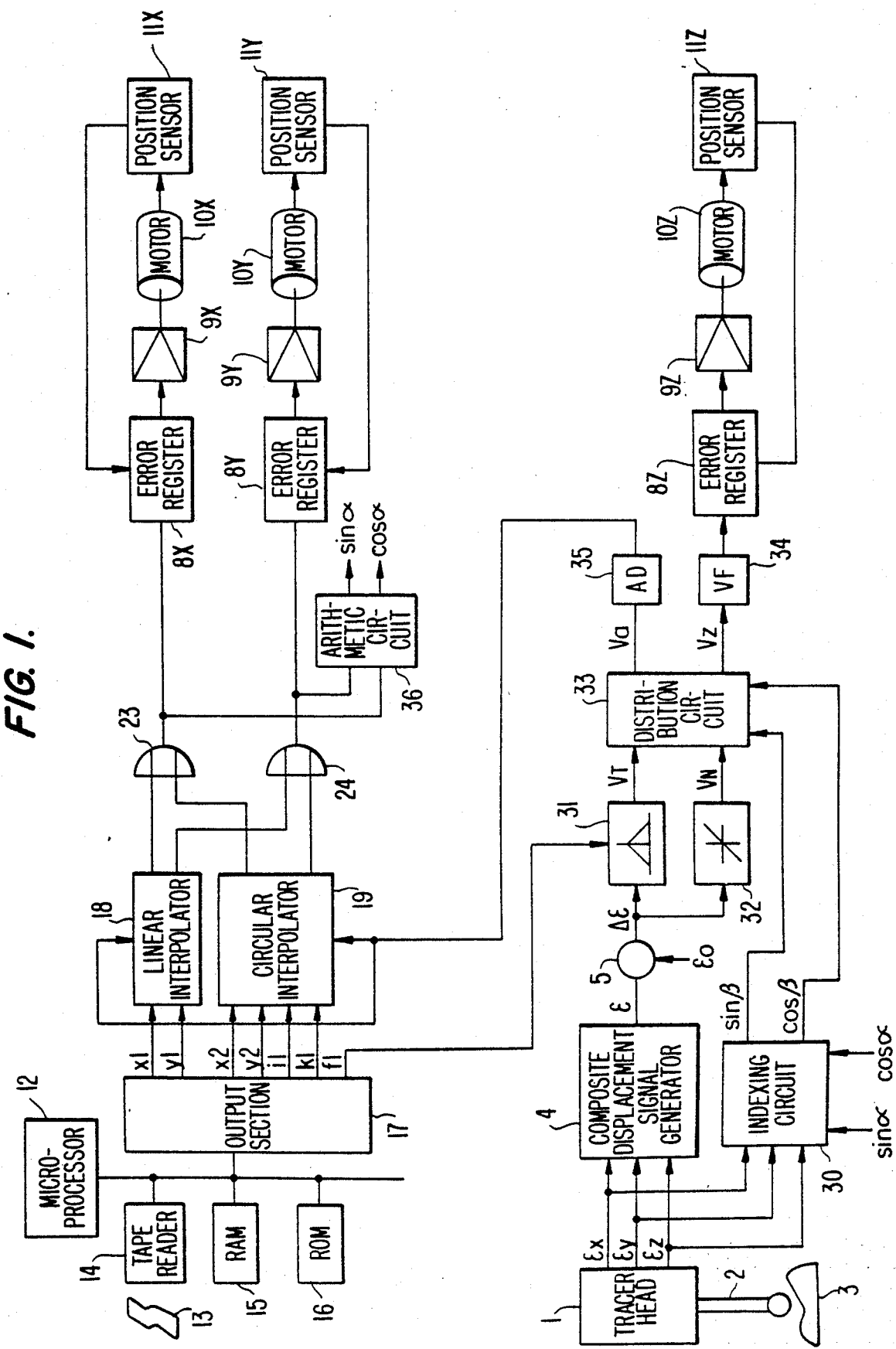
FIG. I.

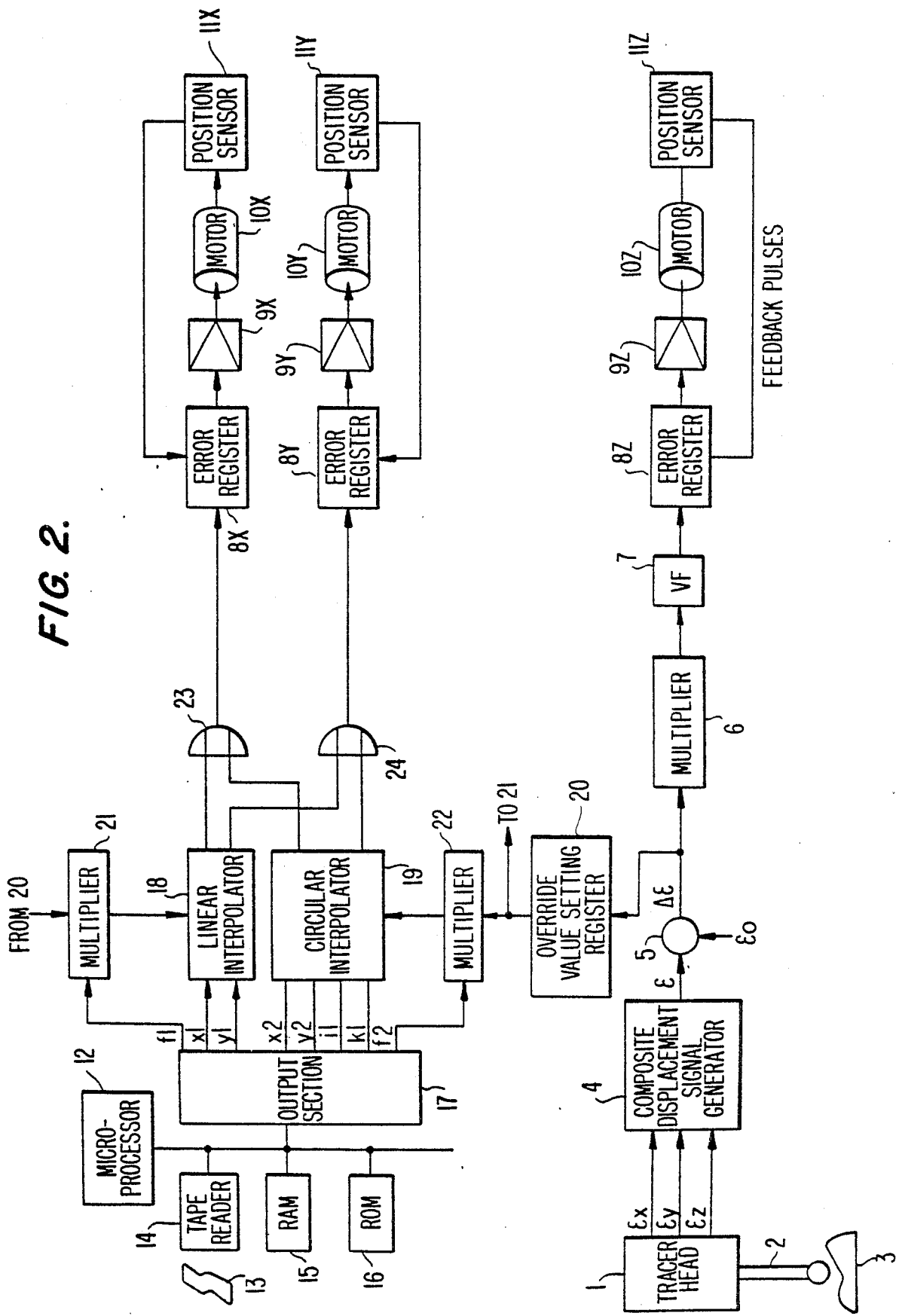

ARBITRARY-DIRECTION TRACER CONTROL UNIT

TECHNICAL FIELD

The present invention relates to an arbitrary-direction tracer control unit which enables a tracer head and a model to be moved relative to each other along a path defined by numerical information.

BACKGROUND ART

A conventional unit of this kind is such, for example, as shown in FIG. 2. In FIG. 2, reference numeral 1 indicates a tracer head, 2 a stylus, 3 a model, 4 a composite displacement signal generator, 5 an adder, 6 a multiplier, 7 a voltage-to-frequency converter, 8X, 8Y, and 8Z X-, Y- and Z-axis error registers, 9X, 9Y, and 9Z X-, Y- and Z-axis amplifiers, 10X, 10Y, and 10Z X-, Y- and Z-axis motors for moving the tracer head 1 and the model 3 relative to each other in the X-, Y- and Z-axis directions, 11X, 11Y, and 11Z X-, Y- and Z-axis position sensors, 12 a microprocessor, 13 a command tape, 14 a tape reader, 15 a RAM, 16 a ROM, 17 an output section, 18 a linear interpolator, 19 a circular interpolator, 20 an override value setting register, 21 and 22 multipliers, and 23 and 24 OR gates.

The tracer head 1 outputs X-, Y- and Z-axis displacement signals $\epsilon_x$, $\epsilon_y$ and $\epsilon_z$ which correspond to displacement of the stylus 2 in the X, Y and Z directions which moves in contact with the model 3. The composite displacement signal generator 4 derives a composite displacement signal, $$\epsilon = \sqrt{\epsilon_x^2 + \epsilon_y^2 + \epsilon_z^2},$$

from the displacement signals $\epsilon_x$, $\epsilon_y$ and $\epsilon_z$ available from the tracer head 1. The adder 5 obtains the difference, $\Delta\epsilon = \epsilon - \epsilon_0$, between the composite displacement signal $\epsilon$ and a reference displacement signal $\epsilon_0$ and applies it to the multiplier 6 and the override value setting register 20. The multiplier 6 multiplies the above-mentioned difference $\Delta\epsilon$ by a predetermined constant K and supplies the voltage-to-frequency converter 7 with a voltage corresponding to the result of the multiplication. The voltage-to-frequency converter 7 provides to the error register 8Z pulses of a frequency proportional to the output voltage of the multiplier 6. The error register 8Z applies to the amplifier 9Z a voltage proportional to the difference between the number of pulses from the voltage-to-frequency converter 7 and the number of feedback pulses from the position sensor 11Z. The output of the amplifier 9Z is provided to the motor 10Z to drive it, moving the tracer head 1 and the model 3 relative to each other in the Z direction. That is, the relative movement of the tracer head 1 and the model 3 in the Z direction is controlled in accordance with the displacement signals $\epsilon_x$, $\epsilon_y$ and $\epsilon_z$ which are provided from the tracer head 1.

The relative movement of the tracer head 1 and the model 3 in the X and Y directions is controlled on the basis of numerical information recorded on the command tape 13. For instance, in the case of moving the tracer head 1 from a point A to a point B directly in FIG. 3(A), numerical information of a format (A) shown below is prerecorded on the command tape 13, and in the case of moving the tracer head 1 from a point C to a point D along a circular arc with the center at a point E in FIG. 3(B), numerical information of a format (B) shown below is prerecorded on the command tape 13.

G01 X x1Y y1F f1  (A)

G02 X x2Y y2I i1K k1F f2  (B)

In the above, x1 and y1 indicate the X and Y coordinates of the point B, x2 and y2 the X and Y coordinates of the point D, f1 and f2 specified feed rates, i1 the distance between the center E of the circular arc and the point C in the X direction, and k1 the distance between the center E of the circular arc and the point C in the Y direction.

When the tape reader 14 reads the numerical information of the format (A) recorded on the command tape 13, the microprocessor 12 provides via the output section 17 the X and y coordinates x1 and y1 of the point B to the linear interpolator 18 and the specified feed rate f1 to the multiplier 21. The multiplier 21 performs a multiplication of the specified feed rate f1 from the microprocessor 12 and an override value from the override value setting register 20 and supplies the linear interpolator 18 with the multiplied output as a signal indicating the velocity of movement of the tracer head 1 in the X-Y plane. The override value setting register 20 is outputs an override value which is inversely proportional to the difference $\Delta\epsilon$ between the composite displacement $\epsilon$ and the reference displacement $\epsilon_0$ which is available from the adder 5. That is, since the above difference $\Delta\epsilon$ increases with an increase in the inclination of the surface of the model 3, the velocity of movement which is commanded to the linear interpolator 18 decreases with an increase in the inclination of the surface of the model 3.

Based upon the coordinate values (x1, y1) of the point B supplied from the microprocessor 12 and the velocity command from the multiplier 21, the linear interpolator 18 produces command pulses for the movement of the tracer head in the X and Y directions and provides the X-direction command pulses via the OR gate 23 to the error register 8X and the Y-direction command pulses via the OR gate 24 to the error register 8Y. As a result of this, the motors 10X and 10Y are driven, by which the tracer head 1 travels along a path A-B at a speed corresponding to the output of the multiplier 21.

Where the numerical information of the format (B) recorded on the command tape 13 is read by the tape reader 14, the microprocessor 12 applies numerical information x2, y2, i1 and k1 to the circular interpolator 19 and the specified feed rate f2 to the multiplier 22. The multipliwer 22 multiplies the specified feed rate f2 from the microprocessor 12 and the override value from the override value setting register 20, and supplies the circular interpolator 19 with the multiplied output as a signal indicating the velocity of movement of the tracer head 1 in the X-Y plane. Based on the numerical information x2, y2, i1 and k1 from the microprocessor 12 and the velocity command from the multiplier 22, the circular interpolator 19 creates command pulses for the movement of the tracer head in the X and Y directions and provides the X-direction command pulses to the error register 8X via the OR gate 23 and the Y-direction command pulses to the error register 8Y via the OR gate 24. As a result of this, the motors 10X and 10Y are driven, by which the tracer head 1 travels along the circular arc with the center at the point E, at a speed corresponding to the output of the multipler 22.

As described above, the conventional unit depicted in FIG. 2 achieves the arbitrary-direction tracing by moving the tracer head 1 and the model relative to each other in the X and Y directions in accordance with numerical information and in the Z direction in accordance with the displacement signals available from the tracer head 1. In this case, however, since the tracing is one-dimensional, a follow-up error occurs on a steep surface portion of the model 3, making it impossible to achieve high accuracy machining.

DISCLOSURE OF THE INVENTION

The present invention offers a solution to such a problem as described above, and has for its object to improve the machining accuracy.

To solve the above-mentioned problem, the present invention comprises:

(1) profile arithmetic means which performs profile arithmetic operations for tracing on the basis of displacement signals in the X, Y and Z directions, which are provided from a tracer head tracing the model surface, and a direction signal indicating the tracing feed direction in the X-Y plane, thereby producing velocity signals in the tracing feed direction and in the Z direction;

(2) Z-direction drive means for moving the model and the tracer head relative to each other in the Z direction in accordance with the Z-direction velocity signal created by the profile arithmetic means;

(3) velocity signal generating means for generating velocity signals in the X and Y directions on the basis of numerical information indicating the path of travel of the tracer head in the X-Y plane and the velocity signal in the tracing feed direction created by the profile arithmetic means;

(4) X- and Y-direction drive means for moving the model and the tracer head relative to each other in the X and Y directions in accordance with the X- and Y-direction velocity signals produced by the velocity signal generating means; and (5) direction signal generating means which generates the direction signal indicating the tracing feed direction in the X-Y plane on the basis of the X- and Y-direction velocity signals produced by the velocity signal generating means and provides the direction signal to the profile arithmetic means.

The present invention obtains the velocity signal in the tracing feed direction by the profile arithmetic means and the X- and Y-direction velocity signals by the velocity signal generating means on the basis of the velocity signal in the tracing feed direction and the numerical information defining the path of travel of the tracer head; since the velocities in the X, Y and Z-directions are all obtained by profile arithmetic operations for tracing, machining can be achieved with a high degree of accuracy.

BRIEF DESCRIPTION OF THE DRAWINGS

FIG. 1 is a block diagram illustrating an embodiment of the present invention;

FIG. 2 is a block diagram showing a prior are example; and

BEST MODE FOR CARRYING OUT THE INVENTION

Figure 3A:
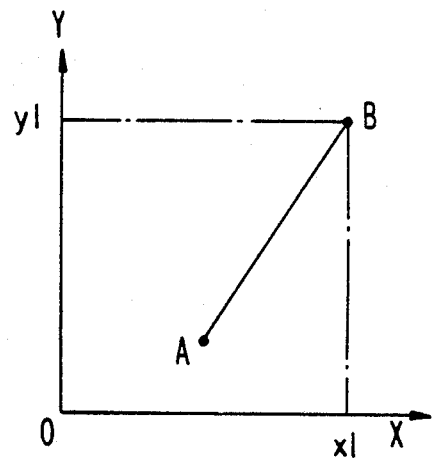
FIG. 3 shows paths of travel of the tracer head.
Figure 3B:
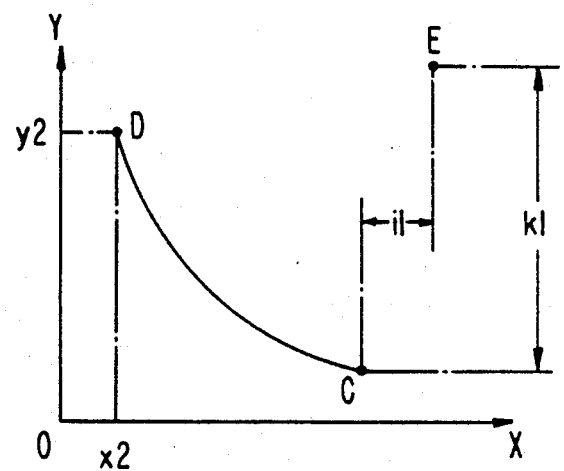

FIG. 1 illustrates in block form an embodiment of the present invention. Reference numeral 30 indicates an indexing circuit, 31 and 32 velocity signal generating circuits for producing a tangential-direction velocity signal $V_T$ and a normal-direction velocity signal $V_N$, respectively, 33 a distribution circuit, 34 a voltage-to-frequency converter, 35 an A-D converter, and 36 an arithmetic circuit. The other reference numerals identical with those in FIG. 1 represent the same parts as in FIG. 1.

The tracer head 1 applies to the composite displacement signal generator 4 and the indexing circuit 30 the displacement signals $\epsilon_x$, $\epsilon_y$ and $\epsilon_z$ corresponding to the displacement of the stylus 2 in the X, Y and Z directions which moves in contact with the model 3. The composite displacement signal generator 4 creates the composite displacement signal, $$\epsilon = \sqrt{\epsilon_x^2 + \epsilon_y^2 + \epsilon_z^2},$$

the adder 4 obtains the difference $\Delta\epsilon$ between the composite displacement signal $\epsilon$ and the reference displacement signal $\epsilon_0$, and the velocity signal generating circuits 31 and 32 produce the tangential-direction velocity signal $V_T$ and the normal-direction velocity signal $V_N$ on the basis of the above difference $\Delta\epsilon$. The indexing circuit 30 obtains a displacement component signal in the direction of displacement, $\epsilon_a = \epsilon_x \cos A + \epsilon_y \sin A$, from the displacement signals $\epsilon_x$ and $\epsilon_y$ in the X and Y directions which are provided from the tracer head 1 and direction signals sin A and cos A (where A indicates the angle between the X-axis and the tracing feed direction) indicating the tracing feed direction, which are provided from the arithmetic circuit 36 described later. Then the indexing circuit obtains a sine signal, $$\sin\beta = \epsilon_z / \sqrt{\epsilon_a^2 + \epsilon_z^2},$$

and a cosine signal, $$\cos\beta = \epsilon_a / \sqrt{\epsilon_a^2 + \epsilon_z^2},$$

on the basis of the displacement component signal $\epsilon_a$ and the displacement signal $\epsilon_z$ in the Z direction which is provided from the tracer head 1. The indexing circuit 30 can be formed by, for example, a combination of a displacement direction indexing circuit 17 and a coordinate transformer 22 disclosed in Japanese Pat. Appln. No. 14098/79.

The distribution circuit 33 derives a velocity signal $V_a$ in the tracing feed direction and a velocity signal $V_z$ in the Z direction from the sine signal sin $\beta$ and the cosine signal cos $\beta$ supplied from the indexing circuit 32 and the tangential-direction velocity signal $V_T$ and the normal-direction velocity signal $V_N$ from the velocity signal generators 31 and 32. The velocity signal $V_z$ in the Z direction is converted by the voltage-to-frequency converter 34 into pulses of a frequency proportional to the voltage value of the velocity signal. The pulses thus obtained are provided to the error register 8Z, by which the motor 10Z is driven, moving the tracer head 1 relative to the model 3 in the Z direction at a speed corresponding to the velocity signal $V_z$. That is, the relative displacement of the tracer head 1 and the model 3 in the Z direction is controlled in accordance with the displacement signals $\epsilon_x$, $\epsilon_y$ and $\epsilon_z$ which are output from the tracer head 1.

The relative displacement of the tracer head 1 and the model 3 in the X and Y directions is controlled in accordance with the numerical information defining the path of travel of the tracer head 1, recorded on the command tape 13, and the velocity signal $V_a$ in the tracing feed direction which is provided from the distribution circuit 33.

Now, assuming that the numerical information of the format (A) is read by the tape reader 14, the microprocessor 12 provides, via the output section 17, the X and Y coordinates (x1 and y1) of the point B to the linear interpolator 18 and the specified feed rate f1 to the velocity signal generator 31. Incidentally, the input/output characteristics of the velocity signal generator 31 are set so that when it is supplied with the specified feed rate f1, the tangential-direction velocity signal $V_T$ at the time when the difference $\Delta\epsilon$ between the composite displacement signal $\epsilon$ and the reference displacement signal $\epsilon_0$ is zero assumes a value corresponding to the specified feed rate f1.

Based on the coordinate value (x1, y1) of the point B which is provided from the microprocessor 12 and the velocity signal $V_a$ in the tracing feed direction which is provided from the distribution circuit 33 via the A-D converter 35, the linear interpolator 18 outputs X- and Y-direction command pulses for driving the tracer head 1 along the path A-B at a speed corresponding to the velocity signal $V_a$. The X-direction command pulses are provided via the OR gate 23 to the error register 8X and the arithmetic circuit 36. The Y-direction command pulses are provided via the OR gate 24 to the error register 8Y and the arithmetic circuit 36. The motors 10X and 10Y are driven by the outputs of the error registers 8X and 8Y, and the tracer head 1 is driven along the path A-B in the X-Y plane at a speed corresponding to the velocity signal $V_a$.

The arithmetic circuit 36 performs the following processing every unit time $\Delta T$. Based on the numbers $N_x$ and $N_y$ of the X- and Y-direction command pulses which are applied thereto for each unit time $\Delta T$, the arithmetic circuit 36 performs operations of the following equations (1) and (2) to create the directions signals sin A and cos A indicating the tracing feed direction, which signals are provided to the indexing circuit 30.

$$\sin A = N_y / \sqrt{N_x^2 + N_y^2} \tag{1}$$

$$\cos A = N_x / \sqrt{N_x^2 + N_y^2} \tag{2}$$

That is, since the amounts of travel in the X and Y directions are in proportion to the numbers $N_x$ and $N_y$ of the X- and Y-direction command pulses, the tracing feed direction for each unit time $\Delta T$ can be obtained by performing the operations of the equations (1) and (2).

When the numerical information of the format (B) is read by the tape reader 14, the microprocessor 12 provides, via the output section 13, the numerical information x2, y2, i1, and k1 to the circular interpolator 19 and the specified feed rate f2 to the velocity signal generator 31. Based on the numerical information x2, y2, i1 and k1 from the microprocessor 12 and the velocity signal $V_a$ in the tracing feed direction from the distribution circuit 33, the circular interpolator 19 outputs X- and Y-direction command pulses for driving the tracer head 1 along the circular arc with the center at the point E at a speed corresponding to the velocity signal $V_a$. As a result of this, the motors 10X and 10Y are driven by the outputs of the error registers 8X and 8Y which are applied to the motors via the amplifiers 9X and 9Y, and the tracer head 1 travels along the circular arc with the center at the point E at the speed corresponding to the velocity signal $V_a$.

Furthermore, the arithmetic circuit 36 produces directions signals sin α and cos α indicating the tracing feed direction and applies them to the indexing circuit 30 in the same manner as described above. In the case of moving the tracer head along a circular arc, the arithmetic circuit 36 sequentially obtains sines and cosines of the circular arc in directions tangential thereto.

While the above embodiment is constituted by hardware, it is also possible, of course, to perform the same processing by software.

As described above, the tracer control unit of the present invention comprises: profile arithmetic means (composed of the composite displacement signal generator 4, the adder 5, the indexing circuit 30, the velocity signal generating circuits 31 and 32, and the distribution circuit 33 in the embodiment) which produces a velocity signal ($V_a$ in the embodiment) in the tracing feed direction and a velocity signal in the Z-axis direction by performing profile arithmetic operations for tracing on the basis of displacement signals in the X-axis, Y-axis and Z-axis directions available from a tracer head tracing the model surface and direction signals (sin α and cos α from the arithmetic circuit 36 in the embodiment) indicating the tracing feed direction in the X-Y plane; Z-direction drive means (composed of the motor 10Z and so on in the embodiment) for moving the model and the tracer head relative to each other in the Z direction in accordance with the Z-direction velocity signal produced by the profile arithmetic means; command pulse signal generating means (composed of the linear interpolator 18, the circular interpolator 19, and so forth in the embodiment) for generating a command pulse signal in the X direction and a command pulse signal in the Y direction on the basis of numerical information indicating the path of movement of the tracer head in the X-Y plane and the velocity signal in the tracing feed direction created by the profile arithmetic means; X- and Y-direction drive means (composed of the motors 10X, 10Y, and so on in the embodiment) for moving the model and the tracer head relative to each other in the X and Y directions in accordance with the X- and Y-direction command pulse signals produced by the command pulse signal generating means; and direction signal generating means (composed of the arithmetic circuit 36 in the embodiment) for generating the direction signal indicating the tracing feed direction in the X-Y plane on the basis of the X- and Y-direction command pulse signals produced by the command pulse signal generating means and supplying the direction signal to the profile arithmetic means. Since the velocities of movement in the X, Y and Z directions are all obtained by profile arithmetic operations for tracing, the present invention possesses the advantage that the machining accuracy is higher than would be obtainable with the prior art example which performs one-dimensional tracing.

We claim:

1. An arbitrary-direction tracer control unit, characterized by the provision of:

profile arithmetic means for producing a velocity signal in a tracing feed direction in the X-Y plane and a velocity signal in the Z direction by performing profile arithmetic operations for tracing on the basis of X-, Y- and Z-direction displacement signals from a tracer head tracking the surface of a model, a direction signal indicating the tracing feed direction and a velocity command signal indicating a feed rate corresponding to numerical information;

Z-direction drive means for driving the model and the tracer head relative to each other in the Z direction in accordance with the Z-direction velocity signal produced by the profile arithmetic means;

command pulse signal generating means for producing a command pulse signal in the X direction and a command pulse signal in the Y direction on the basis of numerical information indicating the path of movement of the tracer head in the X-Y plane and the velocity signal in he tracing feed direction produced by the profile arithmetic means;

X- and Y-direction drive means for driving the model and the tracer head relative to each other in the X and Y directions in accordance with the X- and Y-direction command pulse signals created by the command pulse signal generating means; and direction signal generating means for generating the direction signal indicating the tracing feed direction in the X-Y plane, on the basis of the X- and Y-direction command pulse signals created by the command pulse signal generating means, the direction signal being supplied to the profile arithmetic means.

* * * * *